M. HARTWIG.
SHAFT COUPLING.
APPLICATION FILED JAN. 29, 1914.

1,154,766.

Patented Sept. 28, 1915.

Witnesses:

Inventor,
Max Hartwig,
by Atty.

UNITED STATES PATENT OFFICE.

MAX HARTWIG, OF BERLIN, GERMANY, ASSIGNOR TO GENERAL ELECTRIC COMPANY, A CORPORATION OF NEW YORK.

SHAFT-COUPLING.

1,154,766.  Specification of Letters Patent.  Patented Sept. 28, 1915.

Application filed January 29, 1914. Serial No. 815,305.

*To all whom it may concern:*

Be it known that I, MAX HARTWIG, a subject of the King of Prussia, residing at Berlin, Germany, have invented certain new and useful Improvements in Shaft-Couplings, of which the following is a specification.

This invention relates to devices for coupling together the abutting ends of two shaft or shaft sections, and its object is to permit one of said shafts or sections to be taken out without axial displacement of the adjacent shaft or section. Shaft sections are usually coupled by means of flanges on their abutting ends, through which bolts are passed, and in order to insure axial alinement of the two sections one flange usually has a projection which fits into a recess in the coöperating flange. The projection is either concentric with the shaft, or it may take the form of pins or carriers entering sockets in the other flange. Such a construction, however, prevents the lateral withdrawal of either section without moving it or the other section axially to disengage the interlocking projection and recess or the pins and sockets.

My invention aims to overcome this difficulty and to this end it comprises a projection or projections which can be engaged and disengaged with its or their recess or sockets independently of the shaft sections, with means whereby said movable part or parts can be operated from outside the shaft. When these parts are disengaged, either section of the shaft can be laterally removed without disturbing the other section.

One embodiment of my invention is shown in the accompanying drawing in which—

Figure 1:
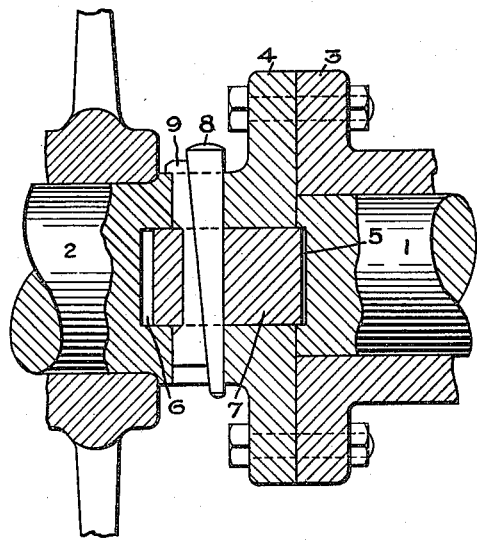
Figure 2:
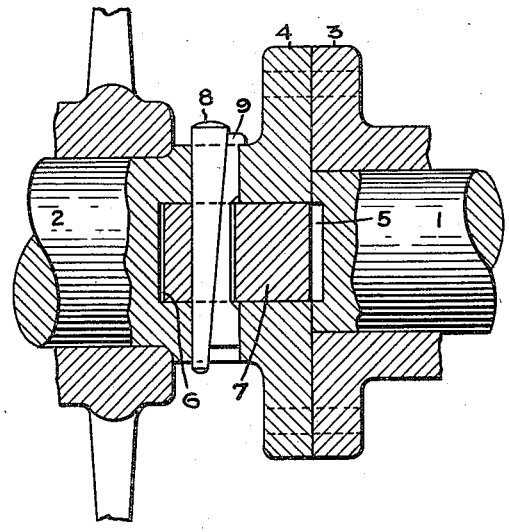

Figure 1 is a longitudinal section of my improved shaft coupling showing the interlocking parts engaged, and Fig. 2 is a similar view showing said parts disengaged.

The shaft sections 1 and 2 are respectively provided with the coupling flanges 3 and 4. A recess 5 is formed centrally in the end of the shaft section 1, while the section 2 has a socket 6 in axial alinement with said recess. A locking member 7 slides axially in the socket and can be moved into and out of engagement with the recess. When it is withdrawn, its right hand end lies flush with the end of its shaft section, so that either section can be removed in a lateral direction without necessitating the axial displacement of the other section. The recess 5, socket 6, and locking member 7 are preferably cylindrical in contour as shown in the drawing, although not necessarily so.

In order to move the locking member to and fro, I prefer to provide the shaft section 2 and the locking member with registering transverse slots in which are received a wedge 8 and a gib 9. When these parts are assembled as shown in Fig. 1, the wedge thrusts the locking member into the recess in the section 1 and the two shaft sections are held in axial alinement. By knocking out the wedge and slipping out the gib and then reversing their positions as shown in Fig. 2, the locking member will be withdrawn from the recess, leaving the shaft sections disconnected and free to be separated in a lateral direction. The flanges may be secured together by any suitable removable fastenings which will transmit the torque from one section to the other.

In accordance with the provisions of the patent statutes I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination with two abutting shaft sections, one having a recess and the other a socket in alinement therewith, of a locking member located in said socket and adapted to slide therein, and means for thrusting it into said recess and withdrawing it therefrom.

2. The combination with two abutting shaft sections, one having a recess and the other a socket in alinement therewith, of a locking member located in said socket and adapted to slide therein, and means engaging with one of said sections for moving said locking member into and out of engagement with said recess.

3. The combination with two abutting shaft sections, one having a central recess and the other a socket in axial alinement therewith, of a locking member sliding in said socket, and means carried by the socketed section for moving said locking member into and out of engagement with said recess.

4. The combination with two abutting shaft sections, one having a central recess and the other a socketing axial alinement therewith of a locking member sliding in said socket and provided with a transverse slot, and a wedge passing transversely through a slot in said shaft and engaging with the slot in the locking member.

5. The combination with two abutting shaft sections, one having a central recess and the other a socket in axial alinement therewith and a transverse slot intersecting said socket, of a locking member in said socket sliding into and out of said recess, and adapted to be withdrawn with its end flush with the end of said shaft section, a transverse slot in said locking member, and a wedge and gib fitting into said slots and adapted when in one position to hold said locking member in engagement with said recess and when reversed to hold said member withdrawn.

6. The combination with two abutting shaft sections, one having a central recess and the other a socket, said recess and socket being axially alined, a cylindrical member arranged to slide axially in said recess and socket and when in normal position to preserve the axial alinement of the shaft sections, means extending through the periphery of a shaft section for moving the member into and out of the recess, and means for uniting the shaft sections and through which power is transmitted from one to the other.

7. The combination with two abutting shaft sections, one having a recess and the other a socket in alinement therewith, of a locking member located in said socket and adapted to slide into and out of said recess for holding the shafts in axial alinement.

In witness whereof, I have hereunto set my hand this 14th day of January, 1914.

MAX HARTWIG.

Witnesses:
ZAETHER REINHARDT,
ERICH LEVY.